Aug. 18, 1964
A. S. DECKER ETAL
3,145,092
LEHR FOR GLASSWARE
Filed Aug. 28, 1961
4 Sheets-Sheet 1
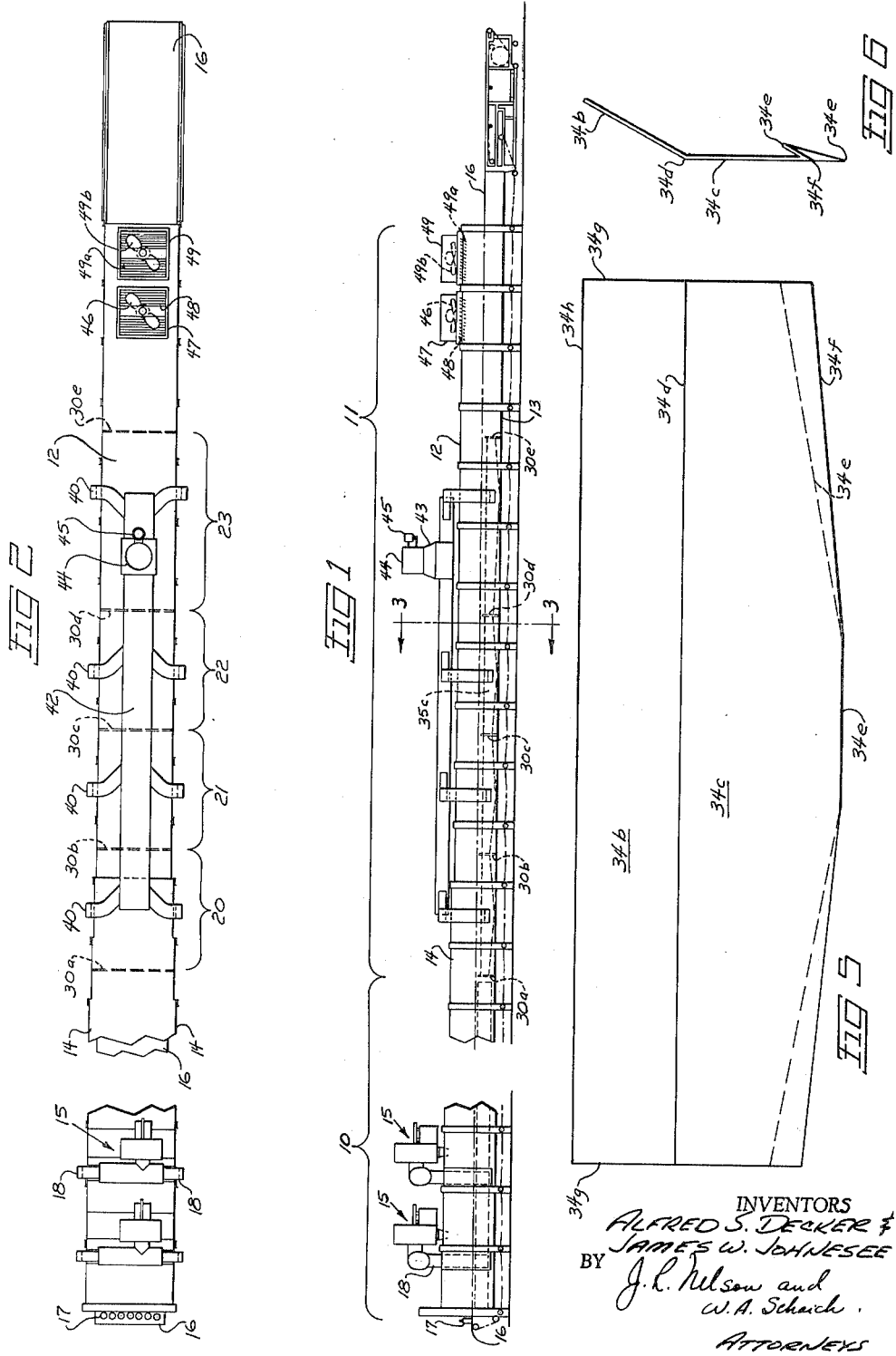

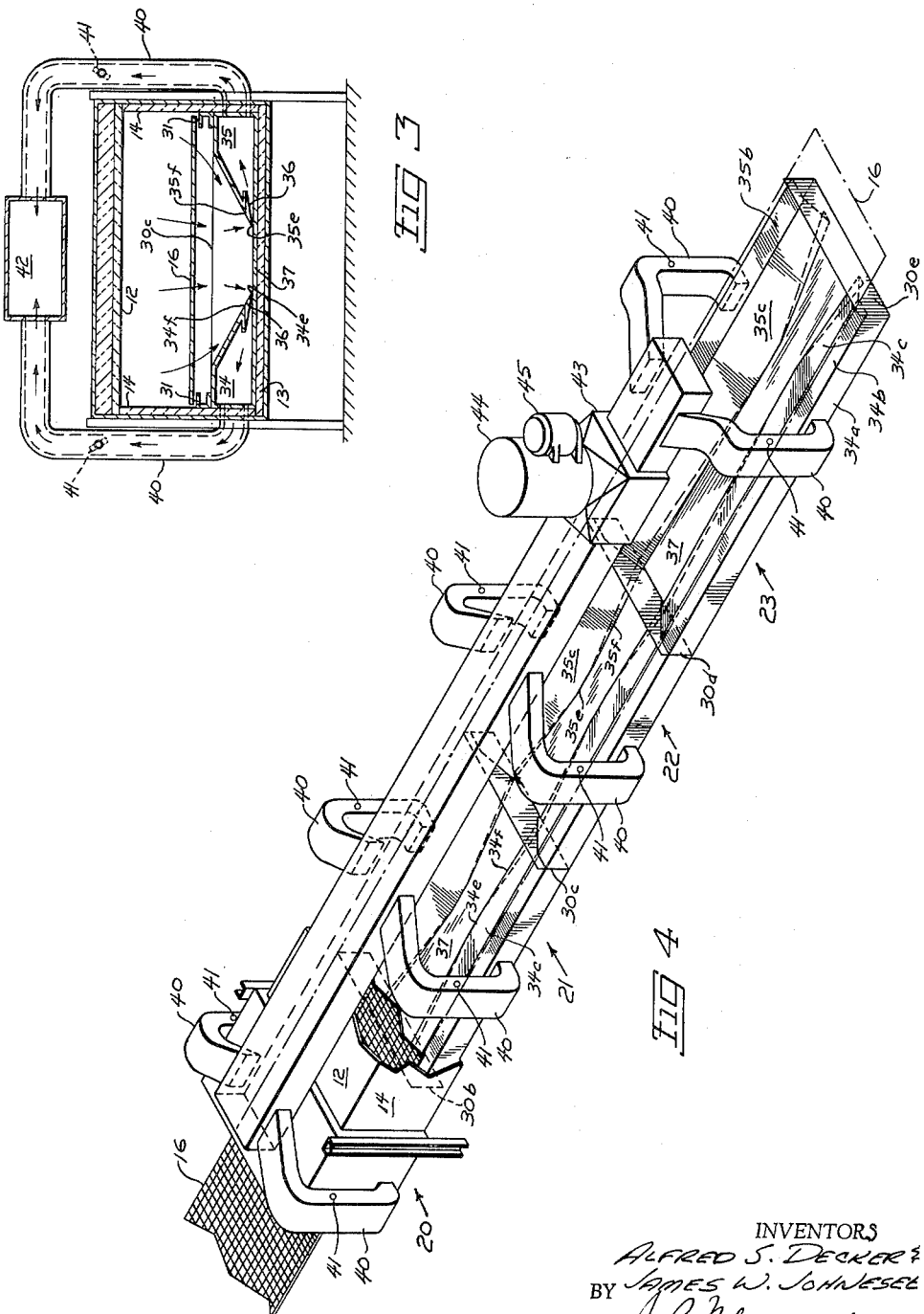

Aug. 18, 1964    A. S. DECKER ETAL    3,145,092
LEHR FOR GLASSWARE
Filed Aug. 28, 1961    4 Sheets-Sheet 3
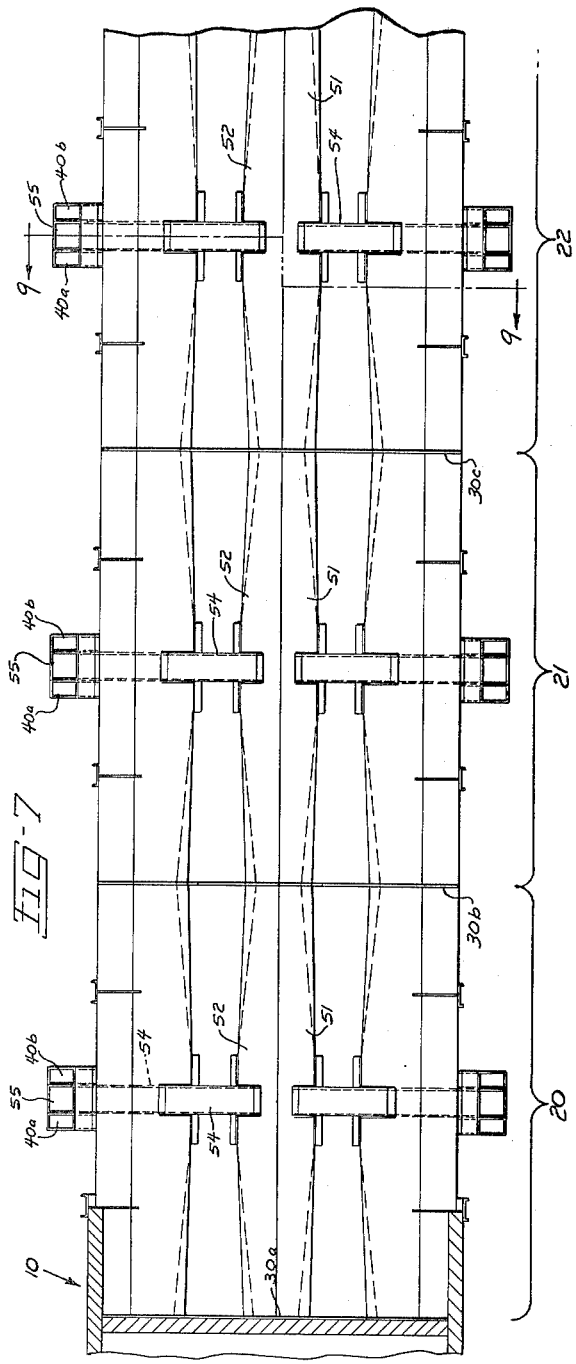
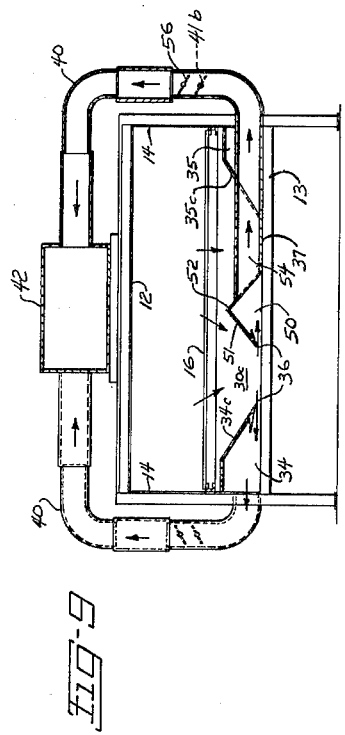
INVENTORS
ALFRED S. DECKER &
BY JAMES W. JOHNESEE
J. R. Nelson and
W. A. Schaich
ATTORNEYS

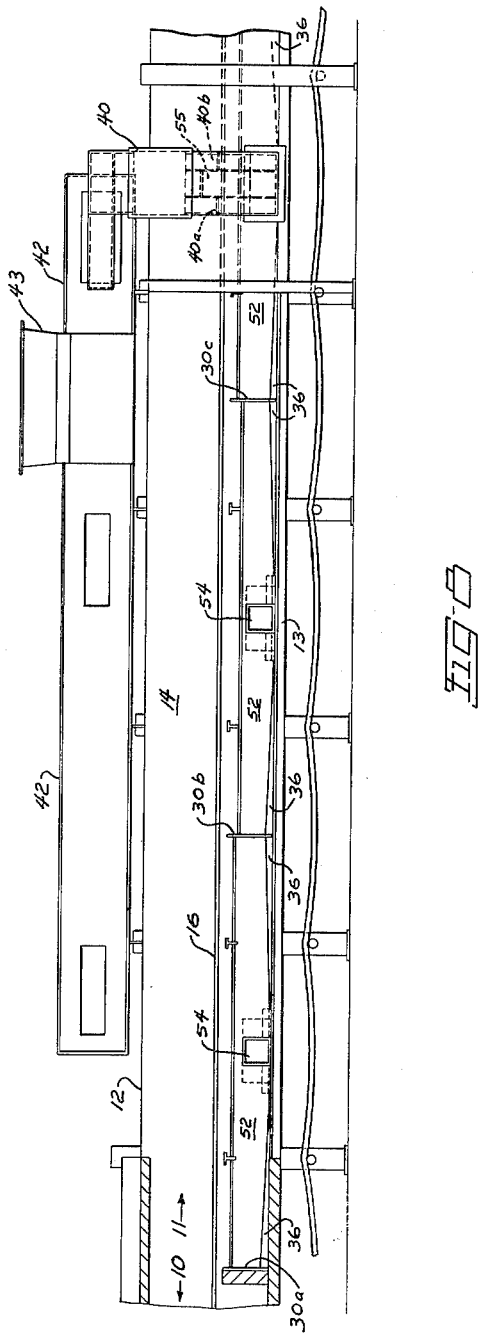

United States Patent Office 3,145,092
Patented Aug. 18, 1964

3,145,092
LEHR FOR GLASSWARE
Alfred S. Decker, Toledo, and James W. Johnesee, Maumee, Ohio, assignors to Owens-Illinois Glass Company, a corporation of Ohio
Filed Aug. 28, 1961, Ser. No. 134,180
6 Claims. (Cl. 65—351)

The present invention relates to lehrs for heat treatment of glassware, and more particularly, to an improvement in lehrs in cooling glassware after heating has been applied to the ware.

Lehrs may be used to anneal glasswear or they may be used to fire or cure a coating or decoration of a material previously applied to the glassware after which the ware must be annealed. The lehr, in either event, will include a tunnel enclosure through which a horizontal conveyor or lehr mat is moved continuously. The glassware, such as bottles, jars or the like, is placed on the lehr at or near the entrance to the tunnel. The ware is thus moved slowly through a heating zone in the tunnel. In the annealing lehr, this section will raise the temperature of the bottle above the annealing temperature for the glass from which it is made. Generally, this is a temperature of around 1000° F. in the case of soda-lime glasses from which most containers are made. Thereafter, the ware is cooled to a temperature for handling.

Present lehrs utilize various means for cooling the ware. Primarily these are in the form of heat exchange passages along the walls or roof of the lehr which conduct cool air and in the process heat is absorbed or exchanged from the ware to the circulated air. Direct cooling or application of cool air directly onto the ware after it leaves the heating section has been tried but heretofore always presented a problem due to breakage and air going through the heating zone causing ineffective annealing, especially along the outside rows of the ware on the lehr belt. Furthermore, cold air applied to the ware as it leaves the heating zone of the lehr applies sudden or "shock" cooling to the ware which would normally cause damage to the ware by an excessive rate of cooling.

It is, therefore, an object of the present invention to provide a practical method and improvement in a lehr cooling section wherein air is moved in direct contact with the ware and yet avoid excessive chilling of the ware. Inasmuch as the cooling zone of the lehr tunnel is elongated, and in operation the lehr mat in this zone is carrying ware that will progressively vary in temperature ranging from the cooler ware at the exit end of the cooling zone to the hotter ware at the end of the cooling zone adjacent the heating zone, it is further a part of this invention to apply the air to the ware in the cooling zone by introducing it near the exit end of the cooling zone and cause it to flow counter to the movement of the ware on the lehr mat and toward the hotter ware at the forward end of the cooling zone. In doing this, the cooling air introduced is progressively elevated in temperature as it passes toward the forward end of the lehr, thus eliminating the shock effect of the coolant as it reaches the hotter bottles. As the air is moved forwardly in the lehr tunnel, portions of the total volume are drawn vertically across the ware and into exhaust sections that are individually, volumetrically regulable. In this respect, the invention provides a means for regulating the air flow in the several cooling sections.

Furthermore, the invention provides for uniform vertical flow of the air across the ware at these sections by uniformly withdrawing the air to exhaust along longitudinal ducts below the ware.

Another object of the invention, therefore, includes a novel exhaust duct structure that lies longitudinally of the cooling zone sections and which connects to an exhaust stack at each section. This exhaust duct connects to the lehr tunnel through an opening between the tunnel and the exhaust duct that has a progressively varying area in respect to the exhaust stack connection with the duct so that along the duct the amount of air drawn into it from the tunnel is uniform. This will result in each section of the cooling zone having a uniform flow of air from above the bottles, down across them and into the outlet to exhaust. The ware is, accordingly, uniformly treated by the coolant in any one of the cooling sections of the cooling zone in reducing its temperature while there.

The effect of cooling on the ware by the several sections is regulable by dampers in the exhaust stacks of each of the sections so that the volume of air drawn off from the tunnel by any one of the sections of the cooling zone may be adjusted.

The specific nature of this invention, as well as other objects and advantages thereof, will become apparent to those skilled in the art from the following detailed description, taken in conjunction with the annexed sheets of drawings, on which, by way of preferred example only, are illustrated an embodiment of this invention.

In the drawings:

FIG. 1 is an overall side elevational view, partly broken away, of the improved lehr of this invention;

FIG. 2 is a plan view of the lehr of FIG. 1;

FIG. 3 is a sectional elevational view taken along line 3—3 of FIG. 1;

FIG. 4 is a perspective view, partly broken away, of the cooling zone structure of the lehr showing the improved features of the invention;

FIG. 5 is a detailed plan view of the cover panel of the exhaust duct of one of the sections of the cooling zone, shown on FIG. 4, which illustrates the structure for defining the tapered opening of the longitudinal duct for withdrawal of air from the lehr tunnel in that section of the cooling zone;

FIG. 6 is an end elevational view of the cover panel of FIG. 5;

FIG. 7 is a sectional plan view of a second form of lehr on which the cooling system of the invention is employed;

FIG. 8 is a side elevational view of the cooling system of the lehr shown on FIG. 7; and FIG. 9 is a staggered cross-sectional view taken along line 9—9 on FIG. 7.

Basically, the cooling system of the present invention consists of dividing the cooling zone of the lehr into cooling sections that extend longitudinally of the lehr tunnel from the heating zone to the packing end. The sections have collecting ducts that are connected to dampered stacks and the collecting ducts are provided with tapering slot inlets through which the spent cooling air is collected and withdrawn through the stacks. The stacks, in turn, are connected to a common exhaust header which is connected into the inlet of an exhaust fan that maintains a negative draft within the cooling sections. The cooling zone is divided into plural sections that are independently regulable to provide an even cooling gradient as the ware travels from the heating zone in the tunnel to the packing table at the end of the lehr. The make up air is supplied into the lehr tunnel by a forced draft fan near the end of the last cooling section or near the packing end of the lehr. This air is forced up the tunnel toward the heating end of the lehr by the negative draft created in the individual cooling sections, above described.

In practice, this cooling system has permitted reduction in the width of the lehr without sacrifice of capacity and overall load, and obtaining the added result of reduced breakage of ware in processing.

The method of annealing may be summarized, under the present invention, as including the novel step of cooling the glassware as it moves out of the annealing zone of the lehr by moving a volume of cooling air into contact with the ware on the open mesh lehr mat from a place near the packing end toward the annealing end of the lehr and removing the air at spaced sections along the cooling zone so that the air will flow across the ware in these sections uniformly and in regulatable amounts.

The novel apparatus for performing this improved cooling will now be described.

On FIGS. 1 and 2, a first form of annealing lehr embodying the invention is shown as comprising an annealing or heating zone 10 and a cooling zone 11. The zones 10 and 11 are formed by an enclosure of top wall 12, bottom wall 13 and opposite sides 14 which are all connected at the corners to define an elongated tunnel. The apparatus for supplying heat into the heating zone 10 of this tunnel for heating the ware being handled may be one of several known types. Since the heating apparatus forms no novel part of this invention per se, it need not be described in detail. In one form of heater, a gas fuel-air mixture is supplied into each heater unit 15 and forced down through a system in top wall 12 of the tunnel and across the ware supported on the horizontal reach 16 of the open-mesh lehr conveyor. This heated air gives up heat to the bottles, one of which is shown at 17, as they are conveyed through the zone 10 and the air is collected in the bottom of the tunnel into conduits 18 which lead back to the heater units 15.

As the ware 17 is conveyed through zone 10, it is elevated above the annealing temperature and controlled through the annealing range. Thereafter, it passes into zone 11. This zone 11 is comprised of several individual sections of the tunnel such as illustrated by numerals 20, 21, 22 and 23 on FIG. 2. In the example of the drawings herein, the lehr is about 5 feet in width and each of sections 20, 21 and 22 are about 10 feet in length. The last section 23 is about 15 feet in length.

The sections are actually structurally defined by the exhaust structure provided below lehr belt 16. Each of the sections are similarly constructed, as follows. Dividing webs 30 of sheet metal or the like extend from the sides 14 of the tunnel and to bottom wall 13 which serves to define the ends of each of the sections 20–23 (see FIG. 2). The webs are consecutively numbered on the drawings as 30a, 30b, 30c, 30d and 30e. As shown in a typical cross-section on FIG. 3, the web 30c extends vertically to a place just under the lehr mat 16. The lehr mat 16 throughout the lehr rides on a grid-work support of spaced apart longitudinal slats (not shown) that are supported from side brackets 31. The support slats are a known construction for supporting the lehr mat 16 for steady horizontal travel through the lehr and are herein omitted from the drawing for ease of illustration since their function in no way contributes directly to the present invention. Accordingly, the webs 30a–e extend vertically in the under portion of the lehr tunnel so as to allow installation of the lehr conveyor guides and, of course, permit operation of the lehr conveyor without interference. For all practical purposes, therefore, these dividing webs separate and define individual lengths, as sections, of the tunnel in the cooling zone 11 in the region below the lehr mat 16 or the region nearly adjacent the underside of the ware 17 being cooled in the lehr.

Along the lower sides and bottom wall of the tunnel are longitudinally extending ducts 34 and 35 which are formed from sheet metal sides 34a and 35a, top sides 34b and 35b and oblique panels 34c and 35c. These longitudinal panels, one of which is shown in detail on FIGS. 5 and 6, are formed together with the respective top side of the duct, such as shown at 34b and 34c. Initially, the sheet metal for these duct parts is cut in a rectangular form and the panel portion 34c is bent on an oblique angle dependent to the top side 34b along the line 34d. Each of the panels are formed along the outer edge 34e to define a tapered opening 36 (FIG. 3) by bending a portion of the lower edge 34e of panel 34c along the divergent line 34f. The central portion of the edge 34e is not turned up so that this portion will join with the bottom metal liner 37 of the lehr. The panels and top members 34b, 34c are installed in the lehr tunnel and integrally joined with side 34a and bottom 37 such that the marginal edge 34h is attached to side 34a and the lower edge 34e is attached to the bottom 37. The end margins 34g are each rigidly connected to the spaced divider webs 30 such that, for example in section 22 of the cooling zone, the end margins 34g abut on the faces of divider webs 30c and 30d. Each section of the cooling zone has a longitudinal duct section 34 similarly installed. Likewise, along the opposite side of the lehr, a section 35 for the duct is similarly installed. Thus, within any given section of the cooling zone, there are tapered openings 36 connecting the lehr tunnel and the ducts 34 and 35.

As will now be described, these openings are strategically located with respect to the exhaust outlet from these longitudinal ducts. On either side of the lehr are vertical exhaust stacks 40. These stacks connect to the ducts 34 and 35 at right angles at an opening in the duct sides 34a and 35a. In cooling sections 20–22, the stacks 40 are disposed centrally of the 10 foot sections so that an opening about 2 feet in length is provided for the connection of stack 40. This provides the strategic location for the formation of the tapering outlet openings 36 in the faces of ducts 34 and 35. The edge 34e, whereat the taper is provided, is joined with the floor 37 coextensively with and of equal length to the outlet opening to the stack 40. The same relationship is true for the duct 35. Thus, the tapered opening 36 extends on either side opposite the exhaust stack-duct connection. This construction allows for uniform withdrawal of air along the length of the sections of ducts 34 and 35. Within each of the ducts, the pressure will vary at points away from the exhaust stack-duct connection. The air pressure will be greatest at this latter connection point and toward the ends of the duct near the divider webs 30 the air pressure will be the least. Conversely, under the construction of the invention, the area along openings 36 will increase at points progressively farther from the exhaust stack-duct connections. Therefore, the area of outlets 36 varies inversely with the air pressure in the ducts and this area varies directly with the distance away from the exhaust stack-duct connection. This provides for uniform withdrawal of air in any of the sections 20–23 of the cooling zone. This likewise provides for uniform air flow across the ware on the lehr mat so that in any one of the sections, the ware is treated uniformly while it moves therethrough.

The volume of air removal or circulation in any one of the sections 20–23 is regulable by means of a damper 41 in the stacks 40. The outer ends of the stacks 40 are connected into a common exhaust header 42. Joined into header 42 is a fan stack 43 which houses an exhaust fan 44. Fan 44 may be an axial flow type fan driven by motor 45, the inlet side of the fan being connected into the stack 43 and the exhaust side of the fan directed into the atmosphere of the factory room or to the outside.

The cool air or coolant for the cooling section 11 of the lehr is supplied by a forced air fan 46 supported at the top side of the lehr tunnel near the exit end of the cooling zone 11. This fan has its outlet connected to a housing 47 which is connected through the top wall 12 of the lehr and communicates with the interior chamber of the lehr tunnel. The housing 47 has a louvered member 48 which is adjustable for directing the air that is supplied by the propeller fan 46 upstream in the lehr tunnel or from right to left on FIG. 1. Downstream of housing 47 is a propeller fan unit 49 which includes a louvered member 49a and propeller fan 49b. Unit 49 provides a downwardly directed air curtain across the exit end of the cooling zone 11 of the lehr to prevent insufflation of outside air into the aft end of the lehr tunnel. The air supplied by the fan 46 is thus introduced near the top wall of the lehr tunnel and flows along the tunnel past the cooling sections 20–23 under the influence of the exhaust systems in each of the sections, as described above. The exhaust systems of these sections create a negative pressure or draft in the lehr tunnel throughout the cooling zone and the air supplied at the inlet housing 47 will thus flow counter or upstream to the flow of the ware on the conveyor 16. The air supplied into the aft end of the cooling zone will represent the total volume of coolant. The dampers 41 in the stacks 40 of each of sections 20–23 will allow withdrawal of some portion of the total volume supplied. Thus, the air is drawn across the ware at the spaced sections of the cooling zone and the desired cooling gradient for cooling the ware from near its annealing temperature to near ambient temperature may be achieved by the system of the invention in a desired manner.

The above described first embodiment of the invention illustrates a form of construction best suited to a lehr of about 5 or 6 feet in width. In lehrs of greater width, such as an 8 foot lehr, the exhaust system is preferably constructed according to the following second embodiment of the invention. The principal change in the wider lehr results in the provision of further longitudinal exhaust ducts to supplement the ducts 34 and 35; the purpose being to supplement the air withdrawal in the sections of the cooling zone so as to cause vertical air movement uniformly across the ware.

As shown on FIGS. 7–9, the lehr comprises an arrangement of heating and cooling zones, as just described. The cooling zone is separated into three individual sections, comparable to the previously described sections 20–22, and they are again so numbered. The sections are defined by divider webs 30a–30c, etc. which extend transversely across the lehr under the support for the lehr conveyor 16. The principal difference in structure here is best shown on FIG. 9 with occasional reference to FIGS. 7 and 8.

Each of the cooling sections of the lehr are provided with the longitudinal ducts 34 and 35 which are constructed and arranged along the lower side corners of the lehr tunnel. Additionally a central longitudinal duct 50 is provided, which is a V-shaped duct formed from complementary panels which are the same as the portions 34c and 35c of the above-described duct work. These panels will be hereinafter referred to as 51 and 52 for purposes of description. In all other respects they are formed with tapered outlet openings 36 when installed along the floor 37 of the lehr the same as in the side ducts 34 and 35. Since FIG. 9 is a staggered sectional view, the opening 36 is shown at the left-hand panel 51. On the right-hand panel 52, it is shown joined to the floor 37 by reason of the section being taken opposite a connection to a side stack 40. The central longitudinal duct sections 50 are each connected to the vertical side stacks 40 by the horizontal conduits 54. These conduits connect into the duct 50 at panel 52 and extend horizontally and transversely of the tunnel to the one side wall 14 of the lehr (right-hand side on FIG. 9). Thereat each conduit 54 forms a connection into a central passageway 55 of vertical stack 40 which extends vertically and includes an individual damper 56. Above this point the passageway 55 of the stack merges into the central passage of side stack 40. The side duct 35 at that side of the lehr has a pair of connections into separated passageways 40a and 40b of the stack which are disposed on either side of the defined chamber 56. Likewise, each of these passageways 40a and 40b are provided with dampers 41a and 41b. Above these dampers the passageways 40a and 40b merge with passageway 55 as a single stack passage that is connected into the common header 42 along the top of the wall 12 of the lehr. Header 42 connects to a fan housing 43 and suction fan 44, as described above for the first embodiment.

In the above description, the same reference numerals are applied to similar parts where applicable and clarity of description permits.

While two embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:

1. In a lehr for glassware which includes adjacent glassware heating and cooling zones, a means for conveying glassware arranged for travel through said zones for successively heating and cooling ware thereon, said zones being enclosed by top and bottom walls and attached sides which together define an elongated tunnel, the improvement comprising means connected into said tunnel for supplying coolant air under pressure into the cooling zone near its top wall at the aft end of the zone for flow in the tunnel toward the heating zone and across the ware toward said bottom wall, outlet means extending longitudinally along said bottom wall of said tunnel comprising elongated duct means, means separating said duct means and the cooling zone portion of said tunnel into end-to-end individual sections, exhaust means adapted to exhaust coolant air from said tunnel and including conduit means connected to each of said sections of the duct means, each section of the duct means having bottom and side walls and an oblique, inwardly disposed, longitudinal panel in said tunnel, each said oblique panel being constructed to define longitudinally divergent openings which connect said tunnel and said duct means in said section, said openings each increasing by reason of said divergence being in either longitudinal direction away from said connection of the conduit means with said duct means, the area of said opening being greatest at the farthest longitudinal point along said panel from the juncture of the conduit means and the duct means, whereby coolant air flow is maintained in each said section for uniformly reducing temperature of the ware therein.

2. The lehr improvement defined in claim 1, wherein said duct means comprises an elongated duct disposed longitudinally along each of the bottom corners of said tunnel, and the exhaust means comprises a longitudinal exhaust header and plural individual exhaust conduits connected on either side of the tunnel individually into each of the sections of said ducts and to said header for exhaust of spent coolant air.

3. The lehr improvement defined in claim 2, wherein is included a central longitudinal duct intermediate said bottom corner ducts, the separating means dividing said central duct into plural individual sections, each of the sections of this duct having a bottom wall and opposite oblique panels constructed and arranged to define a pair of spaced, longitudinally divergent openings into said central duct, and an exhaust conduit connecting each of the sections of this duct to the exhaust header, said panel openings each increasing by reason of said divergence being in either longitudinal direction away from the connection of the duct and the exhaust conduit in each of the said sections, the area of said openings increasing with distance from said last-mentioned connection, said panels thereby providing said divergent openings into this duct from its two opposite longitudinal sides.

4. A lehr for heat treatment of glassware comprising adjacent glassware heating and cooling zones, an air permeable conveyor means supporting glassware for movement longitudinally of the lehr from an inlet end of the heating zone to an exit end of the cooling zone, the movement of the ware by said conveyor means providing for successively heating and cooling ware thereon, said cooling zone being enclosed by top and bottom walls and attached sides defining an elongated tunnel, means connected into said tunnel along said top wall for supplying coolant air into said cooling zone, longitudinally spaced apart divider webs across said tunnel and extending between the sides of the tunnel and from below the conveyor to said bottom wall, a pair of ducts extending longitudinally beneath said conveyor means along the sides of the tunnel, each of the ducts in each said section including a longitudinal oblique panel that is downwardly and inwardly sloped and disposed interiorly of said tunnel, each panel cooperating at its lower edge with an adjacent wall of the duct such that there is a longitudinally divergent slot-like opening formed which connects said tunnel and its said duct for flow of spent coolant air into the latter, exhaust means connected to the duct means of each said section and adapted to exhaust the spent coolant air from said duct section, said exhaust means including a damper for regulating the rate of flow of coolant air exhausted from each said section, said slot-like opening formed by each said panel being divergent in a direction longitudinally away from the connection of the exhaust means with that duct, the area of said opening progressively increasing in relation to the longitudinal distance from said exhaust means-duct means connection, whereby the flow of coolant air through the ware on the conveyor means in each of the tunnel cooling sections will uniformly cool heat treated ware conveyed from the heating zone.

5. In a lehr for heat treatment and cooling of glassware comprising top, bottom and side walls defining an elongated tunnel, an air permeable conveyor extending lengthwise of the tunnel and spaced intermediate the top and bottom walls thereof for moving glassware supported thereon the length of the tunnel, web means extending transversely of said tunnel between the side walls and from beneath the conveyor to the bottom wall dividing the lower region of the tunnel underneath the conveyor into lengthwise, end-to-end cooling sections, means for supplying coolant air under pressure into the cooling sections of the tunnel in the region overlying the ware on the conveyor as it is moving through the lehr on said traveling conveyor and in a direction opposite the movement of said conveyor, a separate longitudinal elongated duct beneath said conveyor in each of said cooling sections, each said duct having plural adjacent walls connected to each other to define a hollow, longitudinally extending chamber, one of the walls of the duct being disposed in said tunnel cooling section in end abutting relationship with the web means, one edge of said one of the walls of the duct being in spaced relation to its adjacent wall thereof to define a slot-like opening into the duct that varies in area along its length, an exhaust conduit connected into said chamber at one of said duct walls, the area of the slot-like opening varying as a function of a taper originating at the web means and extending to a region where the exhaust conduit is connected to the duct, said opening progressively decreasing in area along the duct toward the exhaust conduit connection therewith.

6. In a lehr for heat treatment and cooling of glassware comprising top, bottom and side walls defining an elongated tunnel, an air permeable conveyor extending lengthwise of the tunnel from an inlet end to an exit end and spaced intermediate the top and bottom walls thereof for moving glassware supported thereon the length of the tunnel, said tunnel having at least one lengthwise cooling section adjacent the exit end, means for providing coolant air under pressure supplied from the exit end into the cooling section of the tunnel for flow counter to the movement of the conveyor and in the region overlying the ware on the conveyor as it is moving through the cooling section of the lehr on said traveling conveyor, a longitudinal elongated duct beneath said conveyor in said cooling section, the duct being constructed and arranged to define a longitudinally extending tapered slot-like opening into the duct that varies in area along its length, an exhaust conduit connected into said duct, the area of the opening progressively increasing along the duct in a divergence that extends in either longitudinal direction from the region where the exhaust conduit connects with the duct, said tapered slot-like opening being disposed in the bottom region of the tunnel and inwardly from the side walls thereof.

References Cited in the file of this patent
UNITED STATES PATENTS

| | | |
|---|---|---|
| 1,833,090 | Mulholland | Nov. 24, 1931 |
| 2,244,112 | Merrill | June 3, 1941 |